United States Patent
Nguyen

(10) Patent No.: US 9,099,926 B2
(45) Date of Patent: Aug. 4, 2015

(54) SYSTEM AND METHOD FOR CONNECTING THE MIDPOINT OF A DUAL-DC BUS TO GROUND

(71) Applicant: Hamilton Sundstrand Corporation, Windsor Locks, CT (US)

(72) Inventor: Vietson M. Nguyen, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 56 days.

(21) Appl. No.: 13/649,963

(22) Filed: Oct. 11, 2012

(65) Prior Publication Data

US 2014/0104900 A1 Apr. 17, 2014

(51) Int. Cl.
| | |
|---|---|
| H02M 7/00 | (2006.01) |
| H02M 7/219 | (2006.01) |
| H02M 7/42 | (2006.01) |
| H02M 1/44 | (2007.01) |
| H02M 1/12 | (2006.01) |

(52) U.S. Cl.
CPC ............... *H02M 7/219* (2013.01); *H02M 7/42* (2013.01); *H02M 1/44* (2013.01); *H02M 2001/123* (2013.01); *Y02B 70/1408* (2013.01)

(58) Field of Classification Search
USPC ........... 363/74, 78, 81, 84, 89, 124, 125, 126, 363/127
See application file for complete search history.

(56) References Cited

U.S. PATENT DOCUMENTS

| | | | |
|---|---|---|---|
| 7,633,772 B2 * | 12/2009 | Arnold | 363/39 |
| 8,472,215 B2 * | 6/2013 | Koyama et al. | 363/40 |
| 2002/0076067 A1 * | 6/2002 | Caldwell | 381/110 |
| 2003/0222609 A1 * | 12/2003 | Tolbert et al. | 318/296 |
| 2005/0041442 A1 * | 2/2005 | Balakrishnan | 363/44 |
| 2008/0013352 A1 * | 1/2008 | Baker | 363/125 |
| 2010/0045247 A1 * | 2/2010 | Blanken et al. | 323/273 |
| 2011/0031818 A1 * | 2/2011 | Yang | 307/109 |
| 2013/0163292 A1 * | 6/2013 | Basic et al. | 363/34 |

* cited by examiner

*Primary Examiner* — Jeffrey Gblende
(74) *Attorney, Agent, or Firm* — Kinney & Lange, P.A.

(57) ABSTRACT

A system includes a power source that provides alternating current (AC) power and is connected to system ground; a dual-DC bus that provides direct current (DC) power to a load, and comprises a positive line, a negative line, and a midpoint line; an active rectifier that converts AC power from the power source to DC power for the dual-DC bus; and an impedance circuit connected between the midpoint of the dual-DC bus and the system ground that provides impedance for third harmonic common-mode current.

8 Claims, 2 Drawing Sheets

SYSTEM AND METHOD FOR CONNECTING THE MIDPOINT OF A DUAL-DC BUS TO GROUND

BACKGROUND

The present invention is related to power systems, and in particular to a system and method for connecting a midpoint of a dual-DC bus of an active rectifier system to ground.

Aircraft systems, such as motor drive systems, often require direct current (DC) power for operation. The main sources of power onboard aircraft are generally gas turbine engine driven alternating current (AC) generators. These generators provide polyphase AC power that must be converted into DC power for use in the motor drive and other DC systems. In order to convert the polyphase AC power from the AC power sources into DC power, active rectifiers are often used.

SUMMARY

A system includes a power source, a dual-DC bus, an active rectifier, and an impedance circuit. The power source provides alternating current (AC) power and is connected to system ground. The dual-DC bus provides direct current (DC) power to a load, and comprises a positive line, a negative line, and a midpoint line. The active rectifier converts AC power from the power source to DC power for the dual-DC bus. The impedance circuit is connected between the midpoint of the dual-DC bus and the system ground and provides impedance for third harmonic common-mode current.

DETAILED DESCRIPTION

The present invention describes a system and method for connecting a midpoint of a dual-DC bus of an active rectifier system to system ground. Active rectifiers, such as Vienna rectifiers for three-phase power systems, may provide DC output power on a dual-DC bus. These dual-DC buses have midpoints which are different than the power system ground. It is desirable to connect the midpoint of a dual-DC bus to the power system ground. However, directly tying the midpoint to the power system ground can create issues. For instance, when the active rectifier controller is turned off, there could be a third harmonic current flowing in the short-circuit path to ground. This third harmonic current can be quite high, despite the active rectifier being inactive. Even if the active rectifier is activated prior to applying AC power, there is a transient period before the active rectifier reaches a steady-state in which a third harmonic current may be very high.

The system includes an AC power source, an EMI filter, an active rectifier, and a dual-DC bus that provides DC power to a load from the active rectifier. The dual-DC bus includes a positive voltage line, a negative voltage line, and a midpoint line. The AC power source is connected to the system ground. One embodiment of the present invention involves connecting the midpoint of the dual-DC bus to the system ground through a high frequency impedance circuit. This high frequency impedance circuit comprises a capacitor in parallel with a resistor-capacitor (RC) circuit. In another embodiment, the midpoint of the dual-DC bus is connected to the system ground through a power resistor which is used to reduce the amplitude of a third-harmonic common-mode current to an acceptable level.

Figure 1:
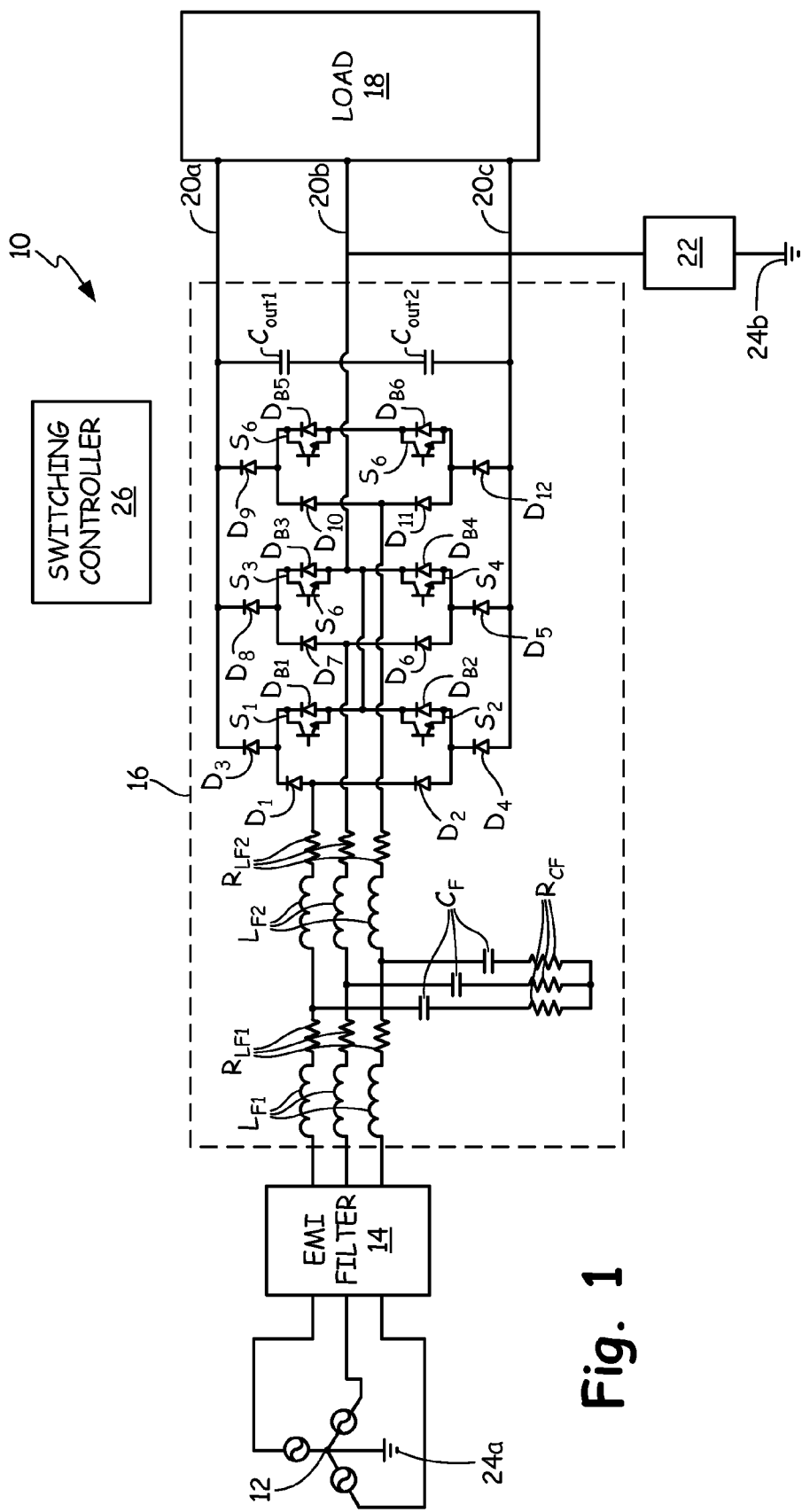
FIG. 1 is a circuit diagram illustrating a system for connecting the midpoint of a dual-DC bus to power system ground according to an embodiment of the present invention.

FIG. 1 is a circuit diagram illustrating system 10 for connecting the midpoint of a dual-DC bus to power system ground according to an embodiment of the present invention. System 10 includes power source 12, EMI filter 14, active rectifier 16, load 18, dual-DC bus lines 20a-20c, impedance circuit 22, and system grounds 24a and 24b. In the present embodiment, power source 12 is a three-phase AC power source connected to EMI filter 14. In other embodiments, power source 12 may include any number of phases. Power source 12 is connected to system ground 24a. Although illustrated as a Vienna rectifier, active rectifier 16 may be implemented as any known active rectifier circuit. EMI filter 14 is utilized to filter EMI generated within system 10. EMI filter 14 may include, among other things, common-mode filters and differential-mode filters. Load 18 is any load that requires DC power such as, for example, an electric motor drive.

Active rectifier 16 is used to convert the three-phase AC power provided by power source 12 into DC power provided on dual-DC bus lines 20a-20c. Active rectifier 16 includes an LCL filter consisting of inductors $L_{F1}$ and $L_{F2}$, corresponding resistances $R_{LF1}$ and $R_{LF2}$, capacitors $C_F$, and corresponding resistances $R_{CF}$. This LCL filter is implemented to further filter EMI within system 10. Active rectifier 16 also includes switches $S_1$-$S_6$, diodes $D_1$-$D_{12}$, body diodes $D_{B1}$-$D_{B6}$, and output capacitors $C_{OUT1}$ and $C_{OUT2}$. Switches $S_1$-$S_6$ are controlled by switching controller 26. Switching controller 26 is implemented using any suitable controller such as, for example, a microcontroller. Switching controller 26 utilizes, for example, pulse-width modulation (PWM) to control switches $S_1$-$S_6$ in order to control the output voltage on the dual-DC bus. Active rectifier 16 allows bidirectional flow between the input and output of the rectifier. Although illustrated as a single rectifier, active rectifier 16 may comprise multiple active rectifiers in parallel to provide better performance.

Load 18 is provided DC power on a dual-DC bus comprising lines 20a-20c from active rectifier 16. Output 20a provides positive DC voltage from active rectifier 16; output 20c provides negative DC voltage from active rectifier 16; and output 20b is a neutral output from active rectifier 16. This type of dual-DC bus configuration provides better efficiency for loads such as, for example, motor drives. Impedance circuit 22 is used to connect midpoint 20b to system ground 24b. System ground 24b is the same as system ground 24a. Because of this, a third harmonic common-mode current may flow in the short-circuit path created by connecting midpoint 20b to system ground 24b. Impedance circuit 22 is utilized to handle this third harmonic common-mode current and allow midpoint 20b to be connected to system ground 24b.

Figure 2B:
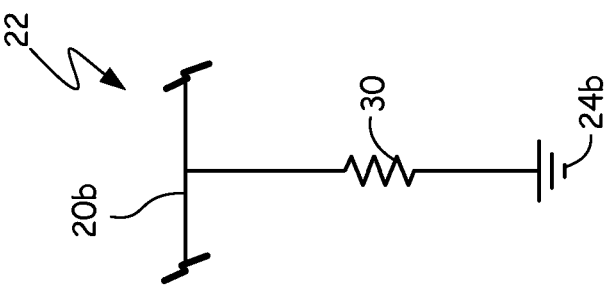
FIG. 2B is a circuit diagram illustrating an impedance circuit according to another embodiment of the present invention.
Figure 2A:
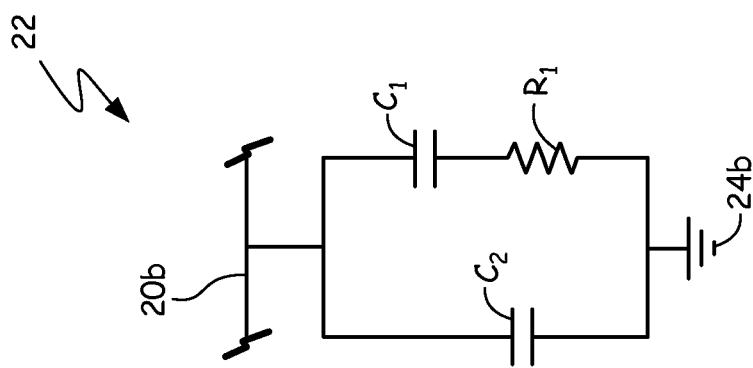
FIG. 2A is a circuit diagram illustrating an impedance circuit according to an embodiment of the present invention.

FIG. 2A is a circuit diagram illustrating impedance circuit 22 according to an embodiment of the present invention. Midpoint line 20b is connected through a high-frequency impedance circuit to system ground 24b, which is the same ground as system ground 24a (FIG. 1). This is done to provide an impedance for any high-frequency third harmonic current flowing in the short circuit path created by connecting midpoint line 20b to system ground 24b. Impedance circuit 22 includes capacitors $C_1$ and $C_2$, and resistor $R_1$. Capacitor $C_1$ and resistor $R_1$ form an RC circuit that is connected in parallel with capacitor $C_2$. Impedance circuit 20 provides a high-frequency impedance path for common-mode EMI on the load side of active rectifier 16. Any values for $C_1$, $C_2$ and $R_1$ sufficient to create a high-frequency impedance may be used. Although illustrated using a capacitor and RC circuit in parallel, impedance circuit 22 may be implemented using any circuit that creates a high frequency impedance between midpoint 20b and system ground 24b.

FIG. 2B is a circuit diagram illustrating impedance circuit 22 according to another embodiment of the present invention. Power resistor 30 is implemented between midpoint line 20b and system ground 24b. This provides damping for the third harmonic common-mode current flowing in the short-circuit path created by connecting midpoint 20b to system ground 24b. The value of resistance for power resistor 30 is any value sufficient to damp the third harmonic current, such as, for example, between 200Ω and 1 KΩ. This resistor should have a power rating sufficient to handle this third harmonic current such as, for example, between 10 watts and 20 watts.

The following are non-exclusive descriptions of possible embodiments of the present invention.

A system according to an exemplary embodiment of this disclosure, among other possible things includes: a power source that provides alternating current (AC) power and is connected to system ground, a dual-DC bus that provides direct current (DC) power to a load, and comprises a positive line, a negative line, and a midpoint line, an active rectifier that converts AC power from the power source to DC power for the dual-DC bus, and an impedance circuit connected between the midpoint of the dual-DC bus and the system ground that provides impedance for third harmonic common-mode current.

The system of the preceding paragraph can optionally include, additionally and/or alternatively, any one or more of the following features, configurations and/or additional components.

The impedance circuit can comprise a first capacitor, and a resistor-capacitor (RC) circuit comprising a resistor connected in series with a second capacitor, wherein the RC circuit is connected in parallel with the first capacitor.

The impedance circuit can comprise a power resistor.

The power resistor has a resistance of between 200Ω and 1 KΩ.

The power resistor has a power rating of between 10 watts and 20 watts.

The power source is three-phase power source.

The active rectifier is controlled by a controller.

An electromagnetic interference (EMI) filter that filters EMI generated by the active rectifier.

A method according to an exemplary embodiment of this disclosure, among other possible things includes: providing alternating current (AC) power to an active rectifier from an AC power source that is grounded to system ground, converting the AC power into direct current (DC) power using an active rectifier, providing the DC power from the active rectifier to a dual-DC bus that includes a positive line, a negative line, and a midpoint line, connecting the midpoint line to the system ground through an impedance circuit, and providing impedance for third-harmonic common-mode current using the impedance circuit.

The method of the preceding paragraph can optionally include, additionally and/or alternatively, any one or more of the following features, configurations and/or additional components.

The impedance circuit can comprise a first capacitor, and a resistor-capacitor (RC) circuit comprising a resistor connected in series with a second capacitor, wherein the RC circuit is connected in parallel with the first capacitor.

The impedance circuit can comprise a power resistor.

The power resistor has a resistance of between 200Ω and 1 KΩ.

The power resistor has a power rating of between 10 watts and 20 watts.

The power source is three-phase power source.

The active rectifier is controlled by a controller.

The method further includes filtering EMI generated by the active rectifier using an EMI filter.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a power source that provides alternating current (AC) power and is connected to system ground;
   a dual-DC bus that provides direct current (DC) power to a load, and comprises a positive line, a negative line, and a midpoint line;
   an active rectifier that converts AC power from the power source to DC power for the dual-DC bus; and
   an impedance circuit connected between the midpoint of the dual-DC bus and the system ground that provides impedance for third harmonic common-mode current;
   wherein the impedance circuit comprises:
      a first capacitor; and
      a resistor-capacitor (RC) circuit comprising a resistor connected in series with a second capacitor, wherein the RC circuit is connected in parallel with the first capacitor.

2. The system of claim 1, wherein the power source is three-phase power source.

3. The system of claim 1, wherein the active rectifier is controlled by a controller.

4. The system of claim 1, further comprising an electromagnetic interference (EMI) filter that filters EMI generated by the active rectifier.

5. A method comprising:
   providing alternating current (AC) power to an active rectifier from an AC power source that is grounded to system ground;
   converting the AC power into direct current (DC) power using an active rectifier;
   providing the DC power from the active rectifier to a dual-DC bus that includes a positive line, a negative line, and a midpoint line;
   connecting the midpoint line to the system ground through an impedance circuit; and
   providing impedance for third-harmonic common-mode current using the impedance circuit;
   wherein the impedance circuit comprises:
      a first capacitor; and
      a resistor-capacitor (RC) circuit comprising a resistor connected in series with a second capacitor, wherein the RC circuit is connected in parallel with the first capacitor.

6. The method of claim 5, wherein the power source is three-phase power source.

7. The system of claim 5, wherein the active rectifier is controlled by a controller.

8. The method of claim 5, further comprising filtering EMI generated by the active rectifier using an EMI filter.

\* \* \* \* \*